United States Patent [19]

Lamarre

[11] Patent Number: 5,045,215

[45] Date of Patent: Sep. 3, 1991

[54] REMOVING HAZARDOUS CONTAMINANTS FROM WATER

[75] Inventor: Bruce L. Lamarre, Piermont, N.H.

[73] Assignee: North East Environmental Products, Inc., Lebanon, N.H.

[21] Appl. No.: 424,678

[22] Filed: Oct. 20, 1989

Related U.S. Application Data

[60] Division of Ser. No. 257,935, Oct. 14, 1988, which is a continuation-in-part of Ser. No. 72,553, Jul. 13, 1987, Pat. No. 4,869,832.

[51] Int. Cl.⁵ ............................................. C02F 1/20
[52] U.S. Cl. .................................. 210/747; 210/750; 210/911; 55/66; 261/113
[58] Field of Search ............... 210/747, 750, 758, 765, 210/902, 911, 103–105, 110, 123, 125, 128, 134, 138, 143, 150, 151; 261/108, 110, 112.1, 113, 114.1, 114.3; 55/66, 196

[56] References Cited

U.S. PATENT DOCUMENTS

| | | | |
|---|---|---|---|
| 3,434,701 | 3/1969 | Bauer | 261/114.1 |
| 4,036,917 | 7/1977 | Slobodyanik | 261/114.1 X |
| 4,526,692 | 7/1985 | Yohe et al. | 210/747 |
| 4,566,522 | 12/1985 | Wilson | 261/114.1 |
| 4,582,610 | 4/1986 | Baker et al. | 210/747 |
| 4,663,089 | 5/1987 | Lowry et al. | 210/750 X |
| 4,756,724 | 7/1988 | Yuill | 55/66 X |

Primary Examiner—Tom Wyse

[57] ABSTRACT

A system for removing hazardous contaminants such as radon gas and volatile synthetic organic chemicals from domestic water supplies includes a perforated, horizontally-oriented tray which is baffled to define a curved (e.g., serpentine, spiral) liquid flow path. Contaminated water is distributed upon a portion of the tray and flows as directed by the baffles to a downcomer and into a storage tank. Air is blown into the storage tank, which is located below the perforated tray, and up through the perforations. The forced air causes the water flowing across the tray to froth, and evaporates the contaminants out of the frothing water. The forced air, carrying the volatilized contaminants, is then vented outside the home.

12 Claims, 3 Drawing Sheets

REMOVING HAZARDOUS CONTAMINANTS FROM WATER

This is a divisional of application Ser. No. 257,935, filed on Oct. 14, 1988, which is a continuation-in-part of Ser. No. 072,553, filed July 13, 1987, now U.S. Pat. No. 4,869,832.

BACKGROUND OF THE INVENTION

This invention relates to removing hazardous contaminants such as radioactive radon gas (radon-222) and volatile synthetic organic chemicals (VOC's) from potable water supplies, particularly for residential use, and a process, apparatus and system therefor.

A. Radon Hazards

Radon is a colorless, odorless, radioactive gas produced from the natural decay of uranium. In outdoor air, radon is diluted and not recognized as a health hazard. However, when radon gas is trapped indoors in air or water, in sufficiently high concentrations, it can be dangerous. Radon has been shown in several epidemiological studies to be a very potent carcinogen that causes lung cancer in humans. In the 1986 publication "A Citizen's Guide to Radon", OPA-86-004, the United States Environmental Protection Agency (EPA) stated that scientists have estimated that about 5,000 to about 20,000 of the 130,000 lung cancer deaths in the United States in 1986 may have been caused by long term exposure to radon gas. This is considered to be the second leading cause of lung cancer, after cigarette smoking. Of these 5,000 to 20,000 deaths, about 500 to 1500 have been attributed to radon from residential potable water supplies. The risk from water-borne radon is considered to be higher than the combined risk from all of the other man-made chemical contaminants in residential drinking water.

Since radon is an alpha emitter, the inhalation of radon gas is considered to be a much greater problem than the ingestion of water containing radon. If the radon is located within the digestive tract, the easily shielded alpha particles are likely to be absorbed by the fluids in the digestive tract, where the energy is harmlessly dissipated. On the other hand, there is no shielding material within the lungs to keep the alpha particles from impinging on the delicate lung tissue, if the radon is inhaled.

Uranium, and therefore radon, is frequently found in granite bedrock deposits, which are common throughout the United States and the world. It is estimated that there are approximately 10 million private bedrock wells in the United States, and that approximately 10% of them are contaminated with radon in excess of 1000 pico-curies per liter (pc/1). Radon typically enters a home along with the water from a bedrock well. Because radon is a volatile gas, it is given off by the water during common household activities such as bathing, showering, and washing dishes. Thus, the radon given off by the water becomes an inhalation hazard. It has been estimated by the EPA that, on an average annual basis, each 10,000 pc/1 concentration of radon in the water supply will translate into an indoor air concentration of 1 pc/1 for homes having average air exchange rates. Of course, homes with a lower air exchange rate would be expected to have higher indoor radon concentrations.

The EPA is currently developing standards for acceptable levels of radon in public water supplies. The range of values for radioactivity concentration being presently considered run from 167 pc/1 per to 40,000 pc/1 (keynote address at "Radon Diagnostician Mitigation Workshop", Apr. 12, 1988, So. Me. Voc. Workshop, Portland, Me.). Although the EPA standard for public water supplies will not be directly applicable to private residences, it is expected that the public will accept and regard this standard as the safe level.

Naturally occurring radon in water generally emanates from the radium (a decay product of uranium) in bedrock surrounding an underground well and through which the water going to the well flows. This is in sharp contrast to the most commonly known sources of contamination in water, which generally arise from remote point contamination sources such as leaky pipes and tanks or improperly disposed of waste materials. As such, some known methods of purifying water of organic contamination are not clearly applicable to removing radon from water.

There are fundamentally two known methods for treatment of water supplies for radon removal in the prior art: decay storage and spray aeration. Conceptually, the simplest example of decay storage is a large baffled water storage tank. Since radon has a radiological half life of only 3.785 days, simply holding the contaminated water in a storage tank for approximately a month will greatly reduce the radon level (by approximately 99½%). One problem with this type of decay storage is that it requires a large tank which maintains essentially plug flow conditions to prevent backmixing.

Another example of decay storage requires accumulation of the radon on an adsorbent material such as activated carbon Since the radon decays relatively rapidly, the concentration of radon on the adsorbent bed will initially increase, and then gradually reach an equilibrium with the influent radon concentration in the water. One disadvantage with this type of system is that the adsorbent bed gives off radioactivity, primarily in the form of gamma rays, as the radon decays, which may itself present a health hazard. A second disadvantage is that it is difficult, at least at the present time and the foreseeable future, to legally dispose of the radioactive carbon filter when it becomes fouled by other water-borne contaminants such as iron, sediment or bacteria.

For spray aeration systems, such as is disclosed in U.S. Pat. No. 4,371,383 to Rost, radon removal efficiencies are reported to be between 80% and 90% for three cycles of spraying (approximately 50% on each separate spray cycle). Therefore, in order to achieve an overall removal efficiency of 99%, the water must be recycled through the spray aeration device 7 to 8 times. This is disadvantageous in that it would require a spray tank that is relatively large (on the order of 100-150 gallons), to provide a sufficient quantity of treated water for use in the home.

A third method is the subject of Applicant's co-pending patent application, U.S. Ser. No. 072,553 for a Radon Removal System. That system includes a packed mass transfer material aeration column which is sized to fit within a single story of a residential building. The contaminated water splashes down through the packing material, while air blown up through the column packing comes into contact with the radon-laden water and evaporates the radon out of the water.

B. Volatile Synthetic Organic Chemical Hazards

In recent years, the contamination of drinking water by organic contaminants (known as volatile synthetic organic chemicals or VOC's) has become recognized as a serious problem in the United States and elsewhere. As stated by the United States Environmental Protection Agency (EPA) in "National Primary Drinking Water Regulations; Volatile Synthetic Organic Chemicals; Final Rule and Proposed Rule", 50 Fed. Reg. 46880-933 (Nov. 13, 1985), exposure to high levels of certain VOC's has been shown to result in a variety of acute and toxic effects in animals, including damage to liver and kidneys, as well as central nervous system effects and cardiovascular changes. Carcinogenic effects have also been demonstrated from exposure to certain VOC's, at least in studies using animals. The EPA has concluded that six VOC's in particular, (benzene, vinyl chloride, carbon tetrachloride, 1,2-dichloroethane, trichloroethylene, and tetrachloroethylene), were either known or probable carcinogens in humans (50 Fed. Reg. at 46886).

From 1975-1982, the EPA conducted six national surveys of the concentrations of certain contaminants in public drinking water systems. The EPA and the United States National Academy of Sciences (NAS) have used various analytic models to also estimate the cancer risk for these drinking water contaminants. The following table, derived from 50 Fed. Reg. 46882-83, presents a comparison of the range of concentrations found by the EPA in the six national surveys to the range of concentrations estimated to produce a $10^{-5}$ increase cancer risk, for each of the six known or probable VOC carcinogens:

| Compound | Concentration Found ($\mu g/l$) | Concentration For $10^{-5}$ Cancer Risk ($\mu g/l$) |
| --- | --- | --- |
| Benzene | 0.2-22 | ~13 |
| Vinyl chloride | 0.2-66 | 0.15-10 |
| Carbon tetrachloride | 0.5-30 | 2.7-45 |
| 1,2-dichloroethane | 0.2-21 | 3.8-7 |
| Trichloroethylene | 0.2-160 | 26-45 |
| Tetrachloroethylene | 0.1-69 | 6.7-35 |

Thus it is clear that the presence of VOC in drinking water constitutes a significant public health hazard.

The class of contaminants that are known as volatile synthetic organic chemicals (VOC's) typically includes, in addition to the six compounds discussed above, the following:

Typical VOC's
Dichloromethane
Dichlorobromomethane
Tribromomethane
Trichloromethane
Trichloroethene
Tetrachloromethane
Chlorodibromomethane
Chloroethane
1,1 Dichloroethane
1,1 Dichloroethene
1,1,1 Trichloroethane
1,1,2 Trichloroethane
Tetrachloroethane
Tetrachloroethene
1,1 Dichloroethylene
1,2 Dichloropropane
1,3 Dichloropropane
Chlorobenzene
Dichlorobenzene
P-dichlorobenzene
Ethylbenzene
Toluene
Xylene meta isomer
Chloroethylene
Trichlorofluoromethane
Styrene
Methyl t-butyl ether
Acetone
Tetrahydrofuran
Diethyl ether
Methyl ethyl ketone
Methyl isobutyl ketone
1,3 Dimethylpropene, trans
Xylenes (ortho & para)
Trichlorotrifluoroethane
1,2 Dichloroethylene cis+trans
Chloromethane
Bromomethane
Bromodichloromethane
Dibromochloromethane
Cyclohexane
Chloromethane
Bromomethane
Bromodichloromethane
Dibromochloromethane
Chlorofluoromethane
Dichlorodifluoromethane
Dichlorotrifluoroethane
Vinyl acetate
Methylene chloride
Carbon disulfide
Trans-1,2 Dichloroethene
Cis-1,2 Dichloroethene
Chloroform
2-Butanone (MEK)
Trans-1,3-Dichloropropene
Cis 1,3 Dichloropropene
2-Chloroethylvinylether
Bromoform
4-Methyl-2 Pentanone (MIBK)
2- Hexanone
1,1,2,2 Tetrachloroethane The health effects of many of these additional VOC's have not been subject to the same scrutiny as the six known or probable carcinogens discussed above, due at least in part to difficulty in detecting the contaminant by analytical methods (50 Fed. Reg. at 46883). However, many of these additional VOC's are found in water supplies and are also believed to constitute cancer and chronic toxicity risks (50 Fed. Reg. at 46926), and are therefore considered hazardous.

Aeration of water using an air-stripping column (packed tower aeration) is known as one method of removing VOC's, but not radon, from water. Two general types of air-stripping aeration systems are known. In one type of system, an aeration column of at least fifteen to thirty-five feet in height is required to remove more than 99% of the VOC contaminants in a single pass through the system. An aeration column of such a height is not considered practical for residential use. In the second type of system, a shorter aeration column may be used to remove more than 90% of the VOC contaminants in the water, but only with multiple passes of the water through the system. In one such system, such as that disclosed in U.S. Pat. No. 4,526,692 to Yohe et al., contaminated water is taken from an underground well and repeatedly pumped through the aeration system and back into the well. The purified water pumped into the well creates a progressively larger buffer zone against influent VOC contamination. This buffer zone would not be useful in inhibiting further radon contamination as the radon source surrounds the well, and any purified water that was injected back into the well would simply become recontaminated with radon which is a product of the decay of Radium, a naturally occurring element in the bedrock into which the well is drilled.

Diffused bubble aeration systems are also known for the removal of VOC's from water. One such system, intended for household use, is disclosed in U.S. Pat. No. 4,663,089 to Lowry et al. In that system, a plurality of separate water holding vessels are used, each vessel having a spiral coil air diffuser delivering low pressure air (1.5-3 psig). The performance of the system is dependent upon the size of the vessels and the residence time of the contaminated water in each vessel. For example, a 160 gpd (gallon per day) system was disclosed which required six 30 gallon tanks with a total residence time of all the water in the system of 1-1.5 days. Consumption of water at a faster rate would result in degraded system performance and higher levels of contamination in the water being used within the residence.

Plate column rectification systems are known for the removal of some volatile substances such as carbonic acid and malodourous substances, but not radon, from water. In such systems, the constituents of a liquid mixture (e.g., contaminated water) are separated by successive distillations (partial vaporizations and condensations) which occur at the numerous stages within the column system. Each stage typically consists of a crossflow sieve-plate. The plates are stacked vertically, and for one type of system, such as is disclosed in U.S. Pat. No. 2,560,978 to Persson et al., a column having five vertical stages (strainer plates) was able to reduce the content of $CO_2$ from 30 mg/l to 4.5 mg/l, a reduction of 85%.

Several methods for removing VOC's, but not radon, from water are discussed in "National Primary Drinking Water Regulations; Volatile Synthetic Organic Chemicals; Final Rule and Proposed Rule", 50 Fed. Reg. 46880-933 (Nov. 13, 1985), promulgated by the EPA. In this rulemaking notice, the EPA listed the known methods used for removing VOC's from drinking water (beginning at 50 Fed. Reg. 46909) as follows:
Aeration:
  a. Packed tower aeration
  b. Multiple tray aeration
  c. Diffused aeration
  d. Spray aeration
  e. Air lift pumping
  f. Cascade aeration
Adsorption:
  a. Granular activated carbon (GAC)
  b. Powdered activated carbon
  c. Synthetic resins
Other Treatment Options:
  a. Point-of-use GAC
  b. Ultraviolet-ozone Each of these methods, except for point-of-use (or point-of-entry) granular activated carbon (GAC), was described by the EPA as intended for relatively large community-wide water systems. Point-of-use devices treat the drinking water at a single faucet, while point-of-entry devices treat the water as it enters the home and provide treated water throughout the home. Known deficiencies in point-of-use and point-of-entry GAC systems include the breakthrough of detectable levels of VOC's due to saturation of the carbon, increases in the level of bacteria in the treated water, and difficulty in monitoring the reliability of the system (50 Fed. Reg. at 46915).

It can be seen therefore, that there is a felt need for a reliable, economic, efficient, inexpensive, convenient, and compact system for the simultaneous removal of both radon and VOC's from residential potable water supplies, particularly one which is sized to fit within the basement of a typical single-family dwelling to provide point-of-entry water treatment.

SUMMARY OF THE INVENTION

A general feature of the invention is a system for removing hazardous contaminants such as radon and volatile synthetic organic chemicals (VOC's) from water, particularly domestic potable water supplies, which includes a tray which is oriented substantially parallel to the horizon and contains a plurality of holes or perforations (preferably between $\frac{1}{8}$ inch and $\frac{1}{2}$ inch in diameter), baffles which are oriented substantially normal (perpendicular) to the tray so that they define a curved fluid (frothing water) flow path across the tray, the flow path extending from an intake portion of the tray to an output portion, and an inlet adapted to distribute liquid to the intake portion of the tray. As used herein, the term "baffles" is intended to include either one or more individual curved elements which form a continuously curved flow path traversing an angle of at least 270° (i.e., a spiral); or at least two individual straight elements offset from each other, each straight element separately causing the curved flow path to traverse an angle of approximately 180°, the angle of rotation reversing at each successive element (i.e., a serpentine). The baffles have the effect of horizontally extending the perforated tray while preventing backmixing and crossmixing of the froth.

In a preferred embodiment, the system has a perforated tray having a substantially rectangular shape, and the baffles define a serpentine flow path across the tray. In another preferred embodiment, the system has a perforated tray having a substantially circular shape, wherein the baffles define a spiral flow path across the tray. With the spiral flow path embodiment, the intake portion of the tray may be centrally located within the spiral with the output portion of the tray located at the periphery of the spiral, or the intake portion may be at the periphery of the spiral with the output portion centrally located within the spiral Preferably also, the system further includes a first liquid container in fluid communication with the output portion of the tray, and either a gas blower adapted to blow gas (e.g., air) upwardly through the holes in the baffled tray, or a fan adapted to draw gas through the holes in the tray. The gas blower is preferably in fluid communication with the first liquid container, the inlet is preferably a spray nozzle, and the intake and output portions of the tray preferably have no holes. The system preferably further includes a downcomer which provides fluid communication between the output portion and the first liquid container. The preferred system includes either a weir elevated above the level of the tray, or a downcomer having a mouth elevated above the level of the tray, so that a sufficient froth depth can be maintained on the tray. Preferably, there are no holes in the output portion of the tray, so that the frothing water can at least partially collapse before entering the downcomer. Preferably also, the system includes a tray cover located above the tray, with the baffles either not extending vertically to the tray cover, whereby the cavity below the cover forms an upper plenum which is not baffled; or with the baffles extending up to the tray cover, whereby the upper plenum is a baffled cavity. The system also preferably further includes an outlet (e.g., a vent stack) in fluid communication with the atmosphere adapted to vent gas out of the plenum, and a first pump in fluid communication with the inlet The first liquid container is preferably a tank located below the tray, and the downcomer preferably extends into the first liquid container. Preferably also, the system further includes a second liquid container (e.g., a pressure tank) remote from the first liquid container, and a second pump in fluid communication with both liquid containers, to pump purified water from the first liquid container to the second liquid container.

Another general feature of the invention is a method for removing hazardous contaminants (e.g., radon and volatile organic chemicals) from water including the steps of distributing the contaminated water upon the intake portion of a baffled and perforated tray, flowing the contaminated water in a curved path across the tray from the intake portion toward an output portion, and causing air to flow upwardly through perforations in the tray as the water flows from the intake portion toward the output portion, whereby the forced air causes the flowing water to froth.

Preferred methods of performing the invention further include the steps of collecting water significantly, purified by removal of the contaminants in a tank, venting air laden with contaminants volatilized from the water to the atmosphere, and flowing the contaminated water in either a serpentine path or a spiral path, in the latter case, the contaminated water may be distributed in the center of the spiral path, or at the periphery of the spiral path. In addition, the preferred method further includes the step of either pressurizing a tank located below the tray, whereby the air is blown from the pressurized tank through the perforations in the tray, or drawing air through the perforations in the tray. Preferably also, the method includes the further steps of pumping the contaminated water from a well, spraying the contaminated water upon the tray, and pumping the purified and collected water into a water storage container, such as a pressure tank.

Yet another general feature of the invention is a system for removing hazardous contaminants (e.g., radon, VOC's) from potable water supplied from a well to a residential structure (e.g., a house), which includes an aeration device; an inlet (e.g., a spray nozzle) adapted to distribute contaminated water above the aeration device; an accumulator tank located below the aeration device, whereby contaminated water which has flowed through the aeration device may be accumulated; a blower located below the aeration device, whereby air may be forced upwardly through the aeration device; an exhaust outlet located above the aeration device and in fluid communication with the atmosphere, whereby contaminated air may be vented to the atmosphere; inlet piping, adapted to connect the inlet with the well; a solenoid valve in the inlet piping, adapted to prevent or permit the flow of water through the inlet piping; and a water level switch having a high water level setting and a low water setting located within the accumulator tank, the water level switch being electrically connected to both the solenoid valve, and the blower, whereby the solenoid valve is energized to permit water to flow through the inlet piping in response to the water level switch reaching its low level setting, whereby the blower is energized to force air through the accumulator device in response to the water level switch reaching its low level setting, whereby the solenoid valve is de-energized to prevent water from flowing through the inlet piping in response to the water level switch reaching its high level setting, and whereby the blower is de-energized from forcing air through the accumulator device in response to the water level switch reaching its high level setting. In a preferred embodiment, the system also includes timer means for keeping the blower from de-energizing for a predetermined period of time after the water level switch has reached its high level setting, the timer means preferably including a timer electrically connected to the blower. The aeration device in the system preferably includes either a circular, perforated, horizontal tray having spiral shaped baffles mounted thereupon, or a rectangular, perforated, horizontal tray having straight baffles mounted thereupon.

Thus, the present invention provides an improved apparatus and method for stripping potable residential water supplies of hazardous contaminants such as radioactive radon gas and volatile synthetic organic chemicals, which is reliable, economical, efficient, inexpensive, convenient, and compact, which is sized to fit within a residential structure, which continuously treats all of the water that the residential user demands and that the well can supply, which positively vents the stripped radon and volatile organic chemicals outside the home, and which reduces the radon concentration by at least 99% and the concentration of many VOC's by up to 99%

Other features and advantages of the invention will become apparent from the following description of the preferred embodiments and accompanying drawings, and from the claims.

DESCRIPTION OF THE PREFERRED EMBODIMENTS

The drawings are first briefly described:

STRUCTURE

Figure 1:
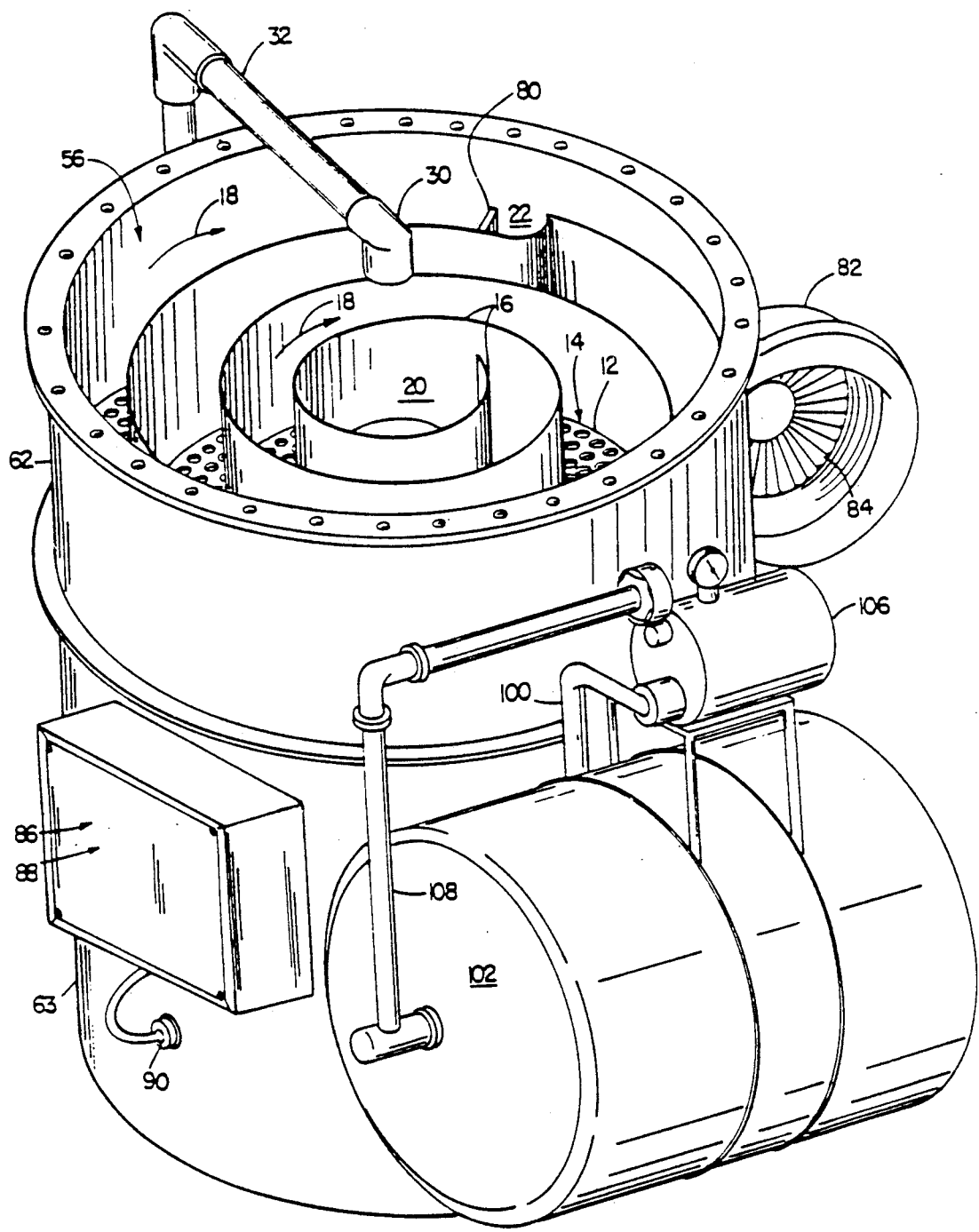
FIG. 1 is a perspective view, with parts removed, of a system for removing hazardous contaminants from water constructed in accordance with a preferred embodiment of the present invention.
Figure 2A:
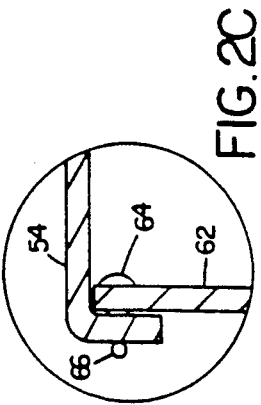
FIG. 2A is an enlargement of the portion of FIG. 2 enclosed within circle 2A.
Figure 2B:
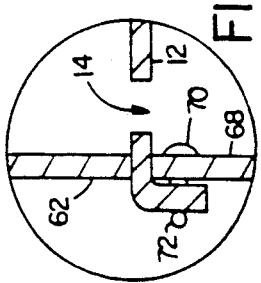
FIG. 2B is an englargemeht of the portion of FIG. 2 enclosed within circle 2B.
Figure 2C:
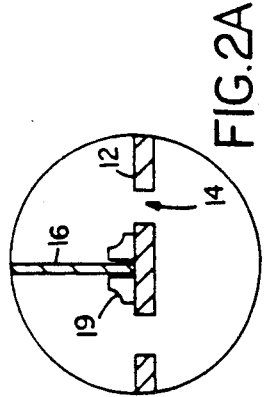
FIG. 2C is an enlargement of the portion of FIG. 2 enclosed within circle 2C.
Figure 2:
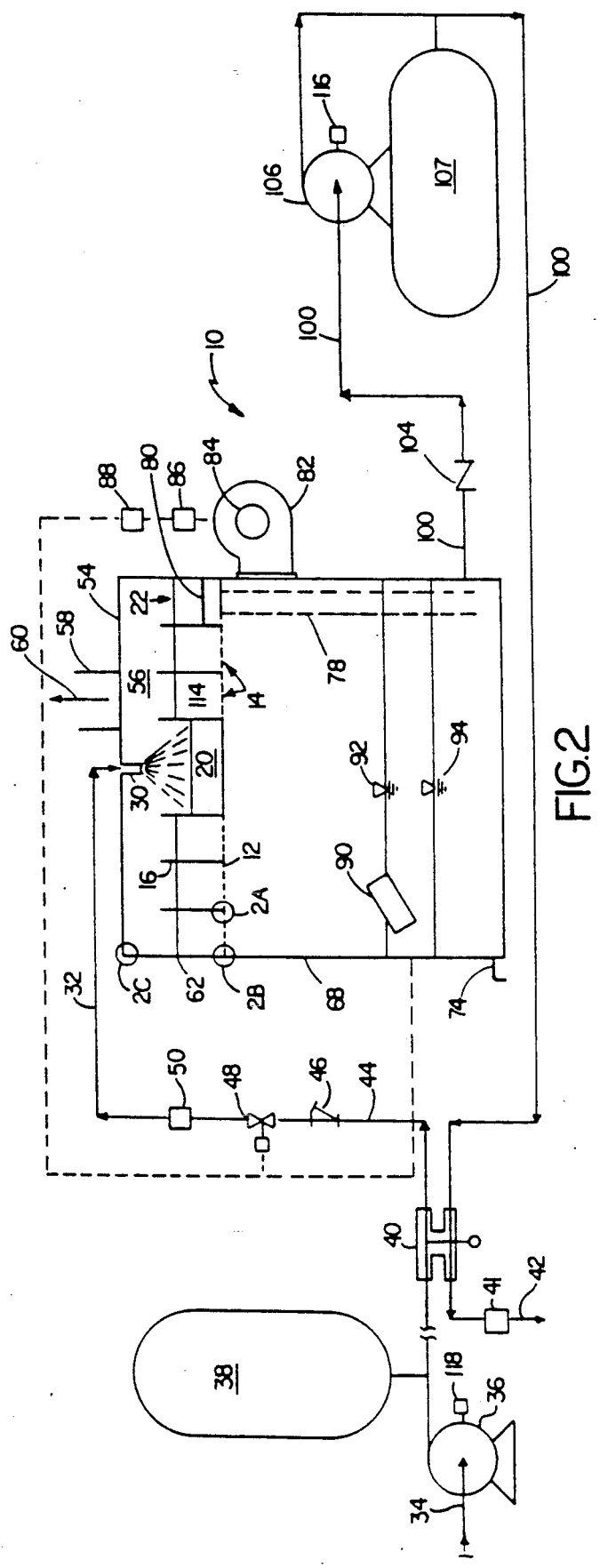
FIG. 2 is a schematic view, of a domestic water system, which includes the system of FIG. 1.
Figure 3:
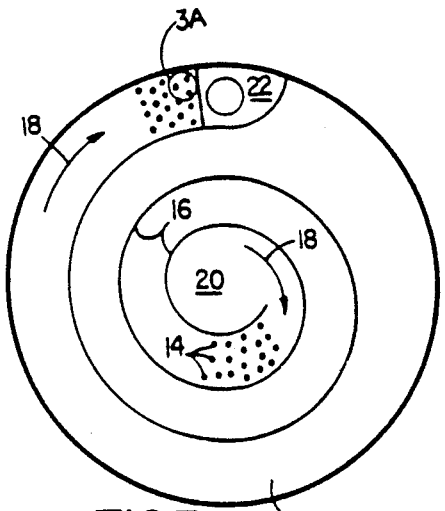
FIG. 3 is a plan view of a preferred embodiment of a portion of the system of FIG. 1.

Referring to FIGS. 1, 2, and 3, there is a system 10 for removing hazardous contaminants such as radon and volatile organic chemicals (VOC's) from water in accordance with the present invention. The system 10 includes a tray 12 which is oriented substantially parallel to the horizon, and is preferably of circular shape. The horizontal orientation is not an absolute requirement for operation of the present invention, but approximate horizontal orientation is preferred.

The circular tray 12 (approximately 24 inches in diameter) might be fabricated from sheet metal or plastic. If the tray were fabricated from sheet metal, for example, it might have a very shallow conical shape, on the order of 2°-5° of slope from a peak in the center out to the periphery. This shallow conical shape would improve the rigidity and stability of the tray 12. Additionally, as will be explained hereinafter, by having the center of the tray 12 slightly higher than the periphery of the tray, the flow of fluid across the tray would be assisted by the force of gravity. As another example, if the tray 12 were molded from plastic, it could be fabricated as a ramped spiral, having a very slight slope (e.g., on the order of 2°-5°). Such a construction would permit the fluid to flow somewhat more easily across the tray 12. It should be noted that too great a slope (i.e., greater than approximately 10%) would be undesirable. Such a large slope would permit the fluid to flow across the tray 12 too quickly, thereby reducing the depth of liquid on the tray and reducing the volume of froth formed.

The tray 12 includes numerous perforations or holes 14. The holes 14 are preferably on the order of between ⅛ inch and ½ inch in diameter. For example, a tray has been used having holes of 3/16 inch in diameter and has been found to perform well. Such a size is large enough to minimize or prevent fouling by contaminants in the water being treated, yet small enough to permit the use of a relatively small and inexpensive air blower, as will be discussed hereinafter. The holes are also small enough to prevent weeping, i.e., the draining of contaminated water directly through the holes.

Figure 3A:
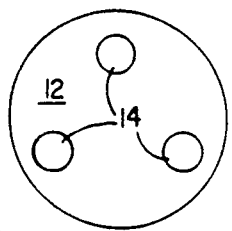
FIG. 3A is an enlargement of the portion of FIG. 3 enclosed within circle 3A.

The holes 14 are preferably oriented in a triangular pattern, with on the order of ⅜ths of an inch between the centers of the holes, as can best be seen from FIG. 3A.

Mounted on the tray 12 are baffles 16 which are oriented substantially normal (perpendicular) to the tray 12 and which define a spiral shaped, curved water flow path, represented by arrows 18, across the tray As shown, the spiral baffles 16 define a flow path of approximately 2½ rotations (~900° total). The baffles 16 are oriented by baffle positioning grooves 19, seen most clearly in FIG. 2A.

As with the orientation of the tray 12, the baffles 16 do not have to be oriented precisely normal to the tray 12. All that is required is that the baffles be oriented so that they have a sufficiently tall (vertical) component to divide the fluid flow path into sufficiently deep channels, preferably greater than 6 inches. For example, the baffles could deflect from vertical by as much as 30°, and no substantial degradation of performance would be expected. The channel formed between the baffles 16 is approximately 3 inches wide. The flow path 18 extends from an intake portion 20 of the tray located approximately in the center of the tray 12, to an output portion 22 of the tray located along the periphery. Neither the intake portion 20, nor the output portion 22, of the tray 12 has holes therethrough.

Figure 4:
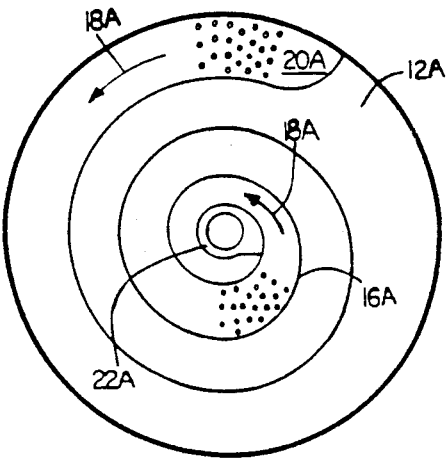
FIG. 4 is a plan view of an alternate embodiment of a portion of the system of FIG. 1.

Alternatively, referring to FIG. 4, the spiral could be reversed so that an alternative tray 12A would have baffles 16A which define a flow path 18A which extends from an intake portion 20A of the tray located along the periphery of the tray 12A, to an output portion 22A of the tray 12A located approximately in the center.

Above the intake portion 20 of the tray 12, there is a spray nozzle 30 which serves as an inlet to distribute water to the intake portion 20. The intake portion 20 is free of holes in order to insure that the spray nozzle 30 does not force contaminated water through the holes, rather than across the flow path 18. The spray nozzle 30 is connected to a supply pipe 32 which leads eventually to a remote source of water, such as a well (not shown).

In a typical domestic water installation, contaminated water from a well would flow into the basement of the home through pipe 34 being drawn by a well pump 36. From there it would pass into a pressure tank 38 where it would be stored for use. The pipe 34, well pump 36, and pressure tank 38 would typically be existing components of the domestic water supply system. From the pressure tank 8 the water would flow through a bypass valve 40. The bypass valve permits the water to be directed either into the system 10 of the present invention, or directly to the household through a flow restrictor 41 (sized to match the flow rate of the well pump 36), and a pipe 42 for ultimate use (e.g., drinking, bathing). Thus, it can be seen, that the bypass valve 40 permits the system 10 of the present invention to be disconnected from the household water supply in the event of leakage or some other problem.

When the bypass valve 40 is properly adjusted, the contaminated water flows through pipe 44, a strainer 46, and a solenoid valve 48 (the function of which will be discussed below), a flow restrictor 50 (approximately 8-10 gpm), and then through the supply pipe 32 and into the spray nozzle 30.

Above the tray 12, there is a tray cover 54. The tray cover has been removed from the system 10 shown in FIG. 1 in order to reveal the baffles 16 and perforated tray 12 within. As shown in FIG. 2, the baffles 16 do not extend to the tray cover 54. In this manner, a non-baffled upper plenum 56 is formed. Alternatively, the baffles 16 could extend all the way up to the tray cover 54, in which event the upper plenum would be baffled just as the tray 12. The only drawback to this arrangement would be that a slightly larger blower (to be discussed below) would be required. An exhaust outlet 58 is attached to the tray cover 54 and allows the venting of contaminants which have been volatilized from the water to be vented to the atmosphere in the direction of arrow 60.

The tray cover 54 is attached on top of a shallow (approximately 10 inches tall) barrel-shaped tank 62. One manner of attaching the tray cover 54 to the tank 62 is shown in FIG. 2C, and includes an O-ring 64 and a circumferential clamp 66. As shown in FIG. 2B, the tank 62 which includes the tray 12 may rest atop an accumulator tank 68. Another O-ring 70 and circumferential clamp 72 ensure a good seal between tanks 62 and 68. The tank 68 is approximately 32 inches tall; thus, the entire system is only approximately 2½ feet tall. A drain valve 74 near the bottom of the tank 68 permits the accumulator tank 68 to be drained as needed.

A downcomer 78 leads from the output portion 22 of the tray 12 into the accumulator tank 68. As shown, the downcomer 78 does not extend all the way to the bottom of the accumulator tank 68. A weir 80 (approximately 2 inches tall) forms a shallow barrier in the flow path prior to the downcomer 78.

A blower 82, which includes an air filter 84, is connected to the accumulator tank 68. The blower 82 has a capacity of approximately 100 cubic feet per minute (cfm) of air, and is connected to the solenoid valve 48 through a timer 86 and a relay 88. The blower 82 is also electrically connected to a level switch 90 which is calibrated between a high water level, designated as 92 (set at a depth of about 10 inches), and a low water level designated as 94 (set at a depth of about 6 inches).

A transfer pipe 100 connects the accumulator tank 68 to a pressure tank 102 through a check valve 104 and a transfer pump 106 (rated on the order of approximately 6-12 gpm at 30 psi). From the transfer pump 106, a pipe 108 leads to the bypass valve 40, which as previously discussed, is in turn connected to the pipe 42 which leads to the various water fixtures in the house.

Figure 5:
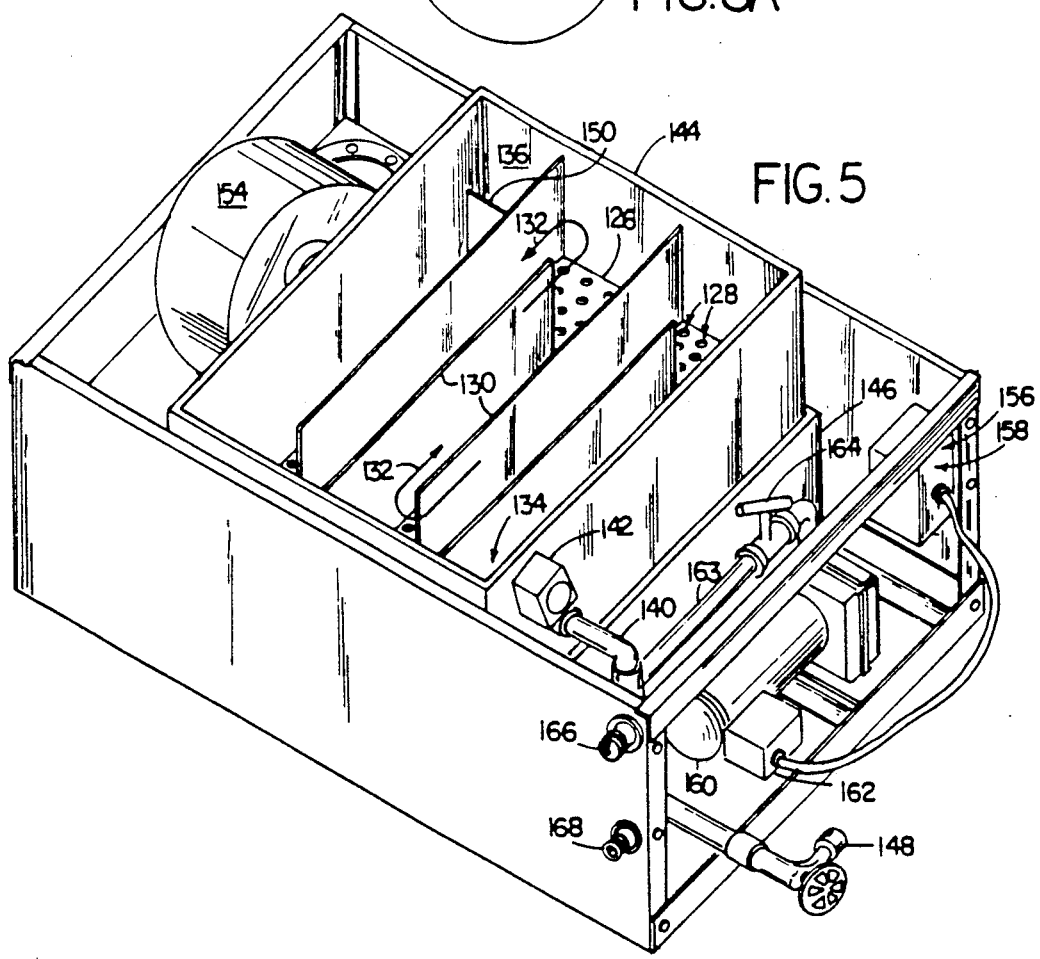
FIG. 5 is a perspective view, also with parts removed, of a system for removing hazardous contaminants from water constructed in accordance with another preferred embodiment of the present invention.

Referring now to FIG. 5, there is a system 124 in accordance with another embodiment of the present invention which is generally similar to the embodiment shown in FIG. 1. In a manner similar to the system 10, the system 124 includes a tray 126 which is oriented substantially parallel to the horizon. The tray 126 is of rectangular shape and measures approximately 16 inches by 24 inches.

The tray 126 includes numerous perforations 128, preferably on the order of between ⅛ inch and ½ inch in diameter. The holes 128 are preferably oriented in a triangular pattern, similar to the holes 14 shown in FIG. 3A. The tray 126 also includes four baffles 130 which are oriented substantially normal (perpendicular) to the tray 126 and which define a serpentine shaped, curved water flow path, represented by arrows 132, across the tray. As shown, the straight baffles 130 define a flow path which causes the water to reverse direction (by 180°) four times. The flow path 132 extends from an intake portion 134 of the tray to an output portion 136 of the tray located along the periphery. Neither the intake portion 134, nor the output portion 136, of the tray 126 has holes therethrough.

Above the intake portion 134 of the tray 126, there is a spray nozzle (not shown) which serves as an inlet to distribute water to the intake portion 134. The spray nozzle is connected to a supply pipe 140 on which a solenoid valve 142 is mounted, and eventually through pipes, a well pump and a pressure tank to a remote source of water, such as a well (all not shown).

Above the tray 126, there typically would be a tray cover (not shown). The tray cover has been removed from the system 124 shown in FIG. 5 in order to reveal the baffles 130 and perforated tray 126 within.

The tray cover would be mounted on top of a shallow (approximately 10 inches tall) rectangular tank 144. As shown, the tank 144, which includes the tray 126, might be mounted on top of an accumulator tank 146 (approximately 12 inches tall). A drain valve 148 near the bottom of the tank 146 permits the accumulator tank to be drained as needed. A downcomer (not shown) leads from the output portion 136 of the tray 126 into the accumulator tank 146. A weir 150 (approximately 2 inches tall) forms a shallow barrier in the flow path prior to the downcomer.

A blower 154 is connected to the accumulator tank 146, and is electrically connected to the level switch (not shown) through a timer 156 and a relay 158. The level switch is calibrated between a high water level (about 10 inches), and a low water level (about 6 inches). A transfer pump 160 having a pressure switch 162 is connected to the accumulator tank 146 through a transfer pipe (not shown). From the transfer pump 160, a pipe 163 leads through a shut off valve 164 to the output (household) part of a bypass valve 166, which would be connected to the various water fixtures in the house. The intake part of the bypass valve is designated as 168.

OPERATION

The operation of the invention will be described with reference to the system 10 disclosed in FIGS. 1, 2, and 3. However, it will be understood that the operation of the system 124 is similar in all important aspects.

Water contaminated with radon or VOC's is pumped from the well (not shown) through the pipe 34 by the pump 36 into the pressure tank 38. From there it flows through the bypass valve 40, the pipe 44, the strainer 46, the solenoid valve 48, the flow restrictor 50, and the supply pipe 32 to the spray nozzle 30 above the tray 12. The contaminated water is sprayed from the nozzle 30 into intake portion 20. The water is partially aerated by passing through the spray nozzle 30, which produces a fine mist.

The water then flows by gravity (at approximately 8 feet per minute at a water flow rate of 6 gpm) in the spiral path 18 defined by the baffles 16 across the tray 12 toward the output portion 22. The blower 82 blows air into the accumulator tank 68, pressurizing the tank to about 3 to 4 inches of water column, and up through the holes 14. As the air emanates from the holes 14 into the water flowing across the tray 12, a froth of bubbles 114 is formed, typically to a depth of 4 to 6 inches. The froth 114 consists of a very large number of thin-walled water bubbles which each has a very large surface area. The contaminants volatilize from the water bubble surfaces into the air, thus purifying the water as it flows along the path 18. The baffles 16 insure that as the froth 114 becomes increasingly purified as it flows across the tray 12, it does not backmix or crossmix with less purified portions of the froth. Since the output portion 22 of the tray 12 has no holes, the frothing water can at least partially collapse before entering the downcomer 78.

After the purified water collects in the accumulator tank 68, it is pumped by the transfer pump 106 through the transfer pipe 100 and the check valve 104 to the pressure tank 102, from where it can be delivered through the pipe 108 and the bypass valve 40 for use (e.g., bathing and drinking) anywhere within the residence.

Air which has been blown through the tray 12 and has become contaminated with radon or VOC's is vented through the exhaust outlet 58 outside of the residence. The vent may be either through the sill plate of the house (in the same manner as a dryer vent) or preferably through a pipe running to a point above the roof line, similar to a sewer vent.

The frothing action on the baffled tray 12 is somewhat similar to what takes place in a tall sieve-tray distillation column. However, the present invention provides the functional equivalent of multiple individual vertical stages on a single shallow baffled tray with a minimal air pressure drop, typically less than three inches of water column. This low pressure drop allows the use of a commonly available low pressure squirrel cage type ventilation blower. This provides a significant advantage over rotary vane blowers and ring compressors which are more expensive, require more power and are noisier.

CONTROL LOGIC

When water is used in the home, the water pressure in the pressure tank 102 drops. When the pressure reaches a sufficiently low value (typically 30 psi), the transfer pump 106 is started by pressure switch 116. When water use in the home stops, the transfer pump 106 continues to run until the pressure has increased to a sufficiently high value (typically 50 psi), at which point the pressure switch 116 shuts off the transfer pump 106.

The water level in the accumulator tank 68 drops as water is transferred out by the pump 106. When the water level in tank 68 drops to the low water level setting 94 of level switch 90, the solenoid valve 48 opens allowing contaminated water to flow from the pressure tank 38, through the supply pipe 32 and onto the baffled tray 12. The level switch 90 also activates the relay 88 and the timer 86 which starts the blower 82 at this time. The well pump 36 is controlled as it normally would be by the existing pressure switch 118. When the water level in the accumulator tank 68 rises to the high water level setting 92 of level switch 90, the solenoid valve 48 closes, stopping the water flow from the pressure tank 38 onto the tray 12. The level switch 90 also, at this time, de-activates the relay 88 and starts the time-down cycle of the timer 86. The timer 86 is an adjustable or fixed interval delay timer that maintains power to the blower 82 for a preset period of time following the cessation of water flow onto the tray 12. This time interval of blower operation (typically 45-60 seconds) provides for the complete treatment of the water which is already on the tray 12 at the time the solenoid valve 48 closes.

The flow restrictor 41 is sized to insure that the maximum flow of water being removed from the accumulator tank 68 is less than the flow of water being transferred into the accumulator tank by the well pump 36 in order to prevent air from being drawn into the transfer pump 106 during periods of extended water use. The flow restrictor 50 is sized to limit the amount of contaminated water being sprayed onto the tray 12, to an amount within the capability of the system.

TESTING

An initial prototype system was constructed in accordance with the present invention (rectangularly shaped, similar to FIG. 5) and installed at a radon-contaminated test site (private residence) in New Hampshire which had a water flow rate of approximately 4.5 gpm. Test results were as follows:

| INITIAL PROTOTYPE TEST RESULTS | | | |
|---|---|---|---|
| Untreated Water Radon conc. (pc/l) | Treated Water Radon conc. (pc/l) | % Removal | Approximate Air Flow Rate (cfm) |
| 106,046 | 200 | 99.8 | 110 |
| 119,369 | 2,506 | 98.0 | 80 |
| 164,244 | 20,040 | 87.8 | 55 |

After review of the preliminary results, a second prototype system was constructed in accordance with the present invention and was operated at two other test sites (also private residences) served by drilled wells. Both wells were approximately 400 feet deep and yielded continuous water flow rates of approximately 6 gallons per minute. The first site (Site A) had an average radon concentration of 600,000 pc/1 while the second site (Site B) had an average radon concentration of 120,000 pc/1. Test results were as follows:

| SECOND PROTOTYPE TEST RESULTS | | | | | |
|---|---|---|---|---|---|
| | Site A | | | | |
| Test Number | 1 | 2 | 3 | 4 | 5 |
| No. of holes in tray | 280 | 280 | 380 | 480 | 480 |
| Spray Nozzle Mist Type | coarse | coarse | coarse | coarse | none |
| Air flow rate (cfm) | 61 | 47 | 50.7 | 105 | 135 |
| Inlet Radon Conc. (pc/l) | 587,712 | 613,081 | 569,727 | 595,477 | 628,581 |
| Outlet Radon Conc. (pc/l) | 10,104 | 1,782 | 3,196 | 1,391 | 2,023 |
| % Reduction | 99.70 | 99.48 | 99.76 | 99.66 | 98.39 |
| | Site B | | | | | |
| Test Number | 1 | 2 | 3 | 4 | 5 | 6 |
| Tray Size (in.) | 16 × 24 | 16 × 24 | 16 × 24 | 16 × 24 | 16 × 24 | 24 × 24 |
| No. of holes in tray | 325 | 325 | 325 | 325 | 325 | 420 |
| Weir height (in.) | none | none | 2 | 2 | 0.785 | 1.5 |
| Water flow rate (gpm) | 6 | 6 | 5 | 5 | 6 | 6 |
| Approx. Air flow (cfm) | 90 | 110 | 90 | 110 | 110 | 110 |
| Inlet Radon Conc. (pc/l) | 120,000 | 130,000 | 108,900 | 132,127 | 150,000 | 120,000 |
| Outlet Radon Conc. (pc/l) | 320 | 3,800 | 3,900 | 465 | 381 | 3,200 |

SECOND PROTOTYPE TEST RESULTS -continued

| % Reduction | 96.83 | 97.00 | 99.57 | 99.71 | 97.87 | 99.73 |

(All tests at Site A were conducted with a 24 inch × 24 inch rectangular baffled tray, without a weir. The water flow rate was 6 gpm for all tests).
(All tests at Site B were conducted with a fine mist spray nozzle)

From a review of these test results it can be seen that the single most important factor effecting the removal of radon from water is the amount of surface area generated for mass transfer. The principal controllable variable is the air flow rate. It has been found that a certain minimum volume of air must be blown through the water as it flows across the tray in order to cause the water to become a sufficiently agitated froth. This minimum air volume was found to be dependent on six variables: water depth on the tray, water flow rate, weir height, weir length, (width across the baffled channel), length of flow path and width of flow path. In the arrangements tested, an air to water ratio of from 60 cu.ft. to 160 cu.ft. was necessary to achieve removal efficiencies about 99.5%.

It has also been found that water depth on the tray is principally governed by the height of the weir placed at the output portion of the tray. These tests confirmed information known in the distillation art, namely that a minimum water depth on the tray of approximately 2 inches is required for good froth generation. When the water depth is less than 2 inches, the maximum froth depth obtainable at any air flow rate is about 4 inches. At a water depth of 2 inches, 6 inches of froth was easily generated. A deeper froth and, therefore, more mass transfer surface area can be generated by making the water depth greater. However, this is done at the expense of a higher pressure drop requirement on the blower. It is desirable to maintain the total system pressure drop at less than 4 inches of water column in order to utilize economical, commercially available blowers having capacities of about 100 cfm.

Another prototype was constructed in accordance with the present invention (circular shape, similar to FIG. 1) and installed at a gasoline-contaminated test site (also a private residence) located near the side of a former used car dealership in New Hampshire, served by a drilled well approximately 300 feet deep). Prior to using the system, there was a noticeable odor of gasoline in the domestic water supply, as well as reported complaints of headaches and rashes. Although the contaminated water was not used for drinking, it was being used for showering and bathing. Following installation of the prototype system, the gasoline odor, as well as the reports of headaches and rashes, ceased.

Two tests samples were taken. It was found that the initial concentrations of contaminants varied with time. Tests results, which are limited by the detection capability of the analysis methodology, were as follows:

| Contaminant | Inlet Concentration ($\mu$g/l) | Outlet Concentration ($\mu$g/l) | % reduction |
|---|---|---|---|
| Sample 1 | | | |
| Benzyne | 6 | <1 | >83 |
| Others (primarily cyclohexane) | 50 | None detected | >98 |
| Sample 2 | | | |
| Benzyne | 21 | <1 | >95 |
| Others (primarily cyclohexane) | 100 | None detected | >99 |

(All testing was with a 24 inch diameter tray having 420 holes, and a 2 inch high weir. The water flow rate was approximately 6 gpm, and the air flow rate was approximately 100-110 cfm.)

Analysis was performed for 35 VOC compounds in addition to the two reported above. However, the results were below the applicable detection limits for both the inlet concentration and outlet concentration for each of these additional compounds. Therefore, no meaningful data is available.

What is claimed is:

1. A method for removing hazardous contaminants from water comprising:
    distributing the contaminated water upon the intake portion of a baffled and perforated tray,
    flowing the contaminated water in a curved flowpath across said tray from said intake portion toward an output portion, and
    causing sufficient air to flow upwardly through perforations in said tray so that the water flowing along said flowpath forms a deep froth while maintaining frothing throughout said flowpath.

2. The method of claim 1 further comprising collecting water significantly purified by removal of contaminants in a tank.

3. The method of claim 1 further comprising venting air laden with contaminants volatilized from the water to the atmosphere.

4. The method of claim 1 wherein the contaminated water is flowed in a serpentine flowpath.

5. The method of claim 1 wherein the contaminated water is flowed in a spiral flowpath.

6. The method of claim 5 wherein the contaminated water is distributed in the center of the spiral flowpath.

7. The method of claim 5 wherein the contaminated water is distributed at the periphery of the spiral flowpath.

8. The method of claim 1 further comprising pressurizing a tank located below said tray, whereby the air is blown from said pressurized tank through perforations in said tray.

9. The method of claim 1 wherein the air is drawn through perforations in said tray.

10. The method of claim 1 further comprising pumping the contaminated water from a well.

11. The method of claim 1 further comprising spraying the contaminated water upon said tray.

12. The method of claim 2 further comprising pumping said collected water into a water storage container.

* * * * *